(12) United States Patent
Hang et al.

(10) Patent No.: US 10,003,263 B2
(45) Date of Patent: *Jun. 19, 2018

(54) OVER VOLTAGE PROTECTION CONTROL METHOD AND CIRCUIT FOR FOUR-SWITCH BUCK-BOOST CONVERTER

(71) Applicant: Silergy Semiconductor Technology (Hangzhou) LTD, Hangzhou, ZheJiang Province (CN)

(72) Inventors: Kailang Hang, Hangzhou (CN); Liangwei Sun, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/349,108

(22) Filed: Nov. 11, 2016

(65) Prior Publication Data

US 2017/0063238 A1    Mar. 2, 2017

Related U.S. Application Data

(63) Continuation of application No. 14/533,257, filed on Nov. 5, 2014, now Pat. No. 9,543,822.

(30) Foreign Application Priority Data

Nov. 7, 2013   (CN) .......................... 2013 1 0548895

(51) Int. Cl.
*G05F 1/10* (2006.01)
*H02M 3/158* (2006.01)
*H02M 1/32* (2007.01)

(52) U.S. Cl.
CPC .......... *H02M 3/1582* (2013.01); *H02M 1/32* (2013.01); *H02M 3/158* (2013.01)

(58) Field of Classification Search
CPC .. H02M 3/1582; H02M 3/1584; H02M 3/158; H03K 17/08; Y02B 70/1466
USPC ............... 323/222, 225, 235, 237, 266, 267, 323/272–276, 279, 282–288; 363/12.15, 363/21.16, 89, 95
See application file for complete search history.

(56) References Cited

U.S. PATENT DOCUMENTS

| 4,958,121 A | 9/1990 | Cuomo et al. |
| 6,147,478 A | 11/2000 | Skelton et al. |
| 6,166,527 A | 12/2000 | Dwelley et al. |

(Continued)

FOREIGN PATENT DOCUMENTS

CN        102055335 A       5/2011

*Primary Examiner* — Rajnikant Patel
(74) *Attorney, Agent, or Firm* — Michael C. Stephens, Jr.

(57) ABSTRACT

In one embodiment, a method of over voltage protection control can include: (i) determining whether an output voltage of a buck-boost converter is in an over voltage condition, where the buck-boost converter includes a first switch coupled to an input terminal and an inductor, a second switch coupled to ground and a common node of the first switch and the inductor, a third switch coupled to ground and a common node of a fourth switch and the inductor, where the fourth switch is coupled to an output terminal of the buck-boost converter; and (ii) simultaneously controlling the first, second, third, and fourth switches in the buck-boost converter by turning on the second and third switches, and turning off the first and fourth switches, in response to the over voltage condition.

16 Claims, 10 Drawing Sheets

(56) References Cited

U.S. PATENT DOCUMENTS

| | | | |
|---|---|---|---|
| 6,194,885 B1 | 2/2001 | Oshima | |
| 6,791,306 B2 | 9/2004 | Walters et al. | |
| 7,145,786 B2 * | 12/2006 | Vinciarelli | H02J 1/102 363/17 |
| 7,176,667 B2 * | 2/2007 | Chen | H02M 1/44 323/282 |
| 7,202,644 B2 * | 4/2007 | Nitta | H02M 3/1582 323/224 |
| 7,391,189 B2 | 6/2008 | Nitta et al. | |
| 7,391,190 B1 * | 6/2008 | Rajagopalan | H02M 3/1582 323/225 |
| 7,425,819 B2 | 9/2008 | Isobe | |
| 8,018,212 B1 * | 9/2011 | Petricek | H02M 3/1582 323/259 |
| 8,067,925 B2 | 11/2011 | Grimm | |
| 8,330,435 B2 * | 12/2012 | Qiu | H02M 3/156 323/224 |
| 8,436,541 B2 | 5/2013 | Olson | |
| 8,710,905 B2 | 4/2014 | Chen | |
| 8,896,279 B2 | 11/2014 | Wu et al. | |
| 2007/0057654 A1 | 3/2007 | Lee | |
| 2007/0285065 A1 * | 12/2007 | Summit | H02M 3/1582 323/225 |
| 2013/0313974 A1 | 11/2013 | Fan et al. | |
| 2014/0198540 A1 | 7/2014 | Xu | |
| 2015/0280559 A1 * | 10/2015 | Vaidya | H02M 3/1582 323/271 |

* cited by examiner

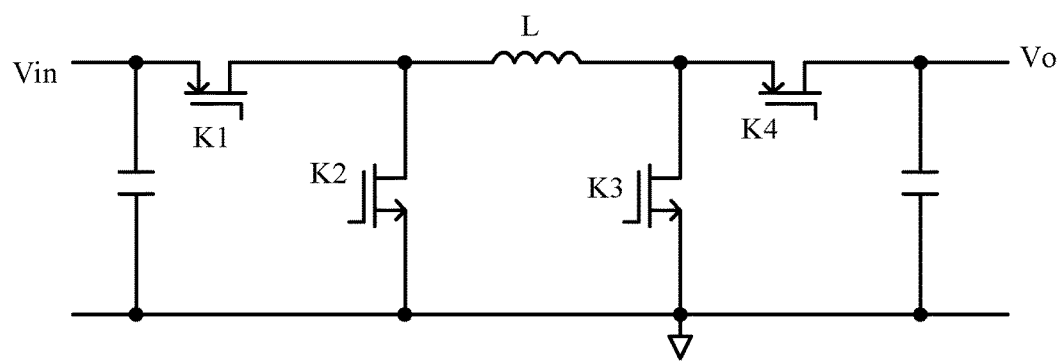
FIG. 1 (conventional)

US 10,003,263 B2

1

OVER VOLTAGE PROTECTION CONTROL METHOD AND CIRCUIT FOR FOUR-SWITCH BUCK-BOOST CONVERTER

RELATED APPLICATIONS

This application is a continuation of the following application, U.S. patent application Ser. No. 14/533,257, filed on Nov. 5, 2014, and which is hereby incorporated by reference as if it is set forth in full in this specification, and which also claims the benefit of Chinese Patent Application No. 201310548895.8, filed on Nov. 7, 2013, which is incorporated herein by reference in its entirety.

FIELD OF THE INVENTION

The present invention relates to the field of power electronics, and more particularly to over voltage protection control methods and circuits for a four-switch buck-boost converter.

BACKGROUND

Switch mode power supplies can efficiently convert electrical power from a source to a load, or to several different loads, with each corresponding to a different output. The main transistor of a switching-mode supply can switch between on and off states at a given operating frequency, and voltage regulation can be achieved by varying the ratio of the on-to-off time of the main transistor. Switch mode power supplies may have relatively high power conversion efficiency, as compared to other types of power converters. Switch mode power supplies may also be substantially smaller and lighter than a linear supply due to the smaller transformer size and weight.

SUMMARY

In one embodiment, a method of over voltage protection control can include: (i) determining whether an output voltage of a buck-boost converter is in an over voltage condition, where the buck-boost converter includes a first switch coupled to an input terminal and an inductor, a second switch coupled to ground and a common node of the first switch and the inductor, a third switch coupled to ground and a common node of a fourth switch and the inductor, where the fourth switch is coupled to an output terminal of the buck-boost converter; and (ii) simultaneously controlling the first, second, third, and fourth switches in the buck-boost converter by turning on the second and third switches, and turning off the first and fourth switches, in response to the over voltage condition.

In one embodiment, an apparatus can include: (i) a buck-boost converter including a first switch coupled to an input terminal and an inductor, a second switch coupled to ground and a common node of the first switch and the inductor, a third switch coupled to ground and a common node of a fourth switch and the inductor, where the fourth switch is coupled to an output terminal of the buck-boost converter; (ii) an over voltage detection circuit configured to receive a voltage feedback signal indicative of an output voltage of the buck-boost converter, and an over voltage threshold signal, and to generate an over voltage signal; (iii) a first control circuit configured to generate a first PWM control signal according to an operation mode of the buck-boost converter; (iv) a first logic circuit configured to receive the first PWM control signal and the over voltage signal, and

2 to control the first and second switches; (v) a second control circuit configured to generate a second PWM control signal according to the operation mode of the buck-boost converter; and (vi) a second logic circuit configured to receive the second PWM control signal and the over voltage signal, and to control the third and fourth switches.

BRIEF DESCRIPTION OF THE DRAWINGS

FIG. 1 is a schematic block diagram of an example power stage circuit of a four-switch buck-boost converter.

DETAILED DESCRIPTION

Figure 2:
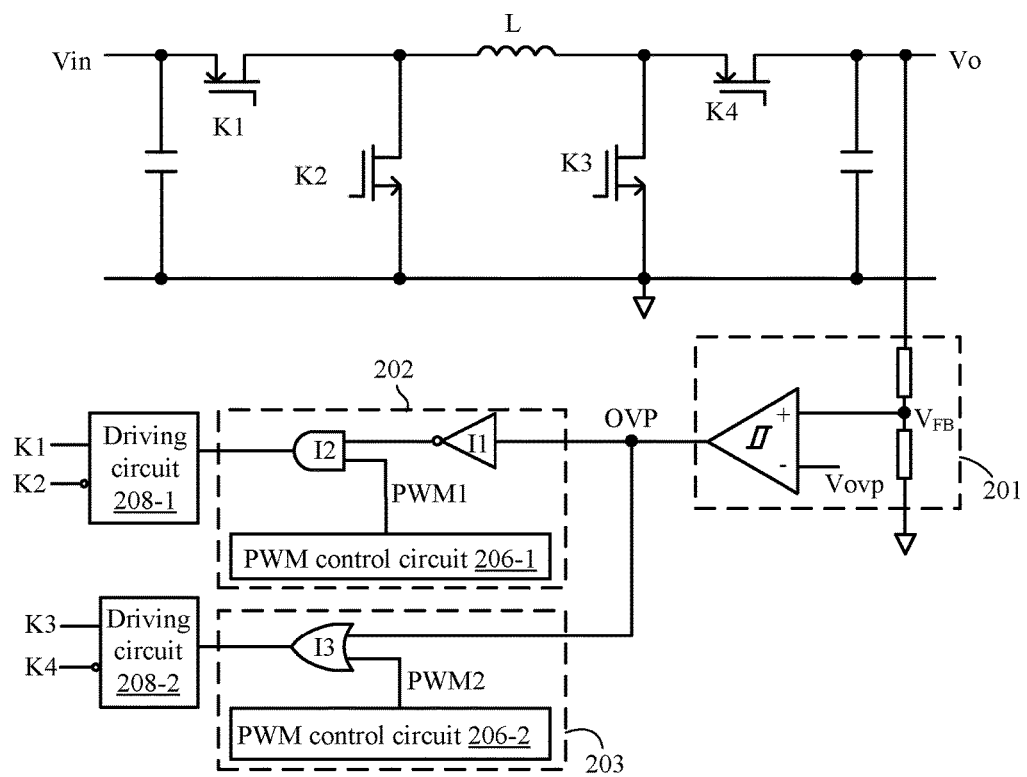
FIG. 2 is a schematic block diagram of an example over voltage protection control circuit of a four-switch buck-boost converter, in accordance with embodiments of the present invention.

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Referring now to FIG. 1, shown is a schematic block diagram of an example power stage circuit of a four-switch buck-boost converter. Four-switch buck-boost converters are widely used in fields like electrical power, communications, various electronic instruments, etc., and may include advantages of relatively high stability and efficiency. Generally, a power stage circuit of a four-switch buck-boost converter can include switches K1, K2, K3 and K4, and inductor L. For example, switch K1, inductor L, and switch K4 can be coupled in series between input and output terminals of the converter. Also, switch K2 can connect to a common node of switch K1 and the inductor L, and also to ground. Switch K3 can connect to a common node of switch K4 and inductor L, and also to ground.

This example four-switch buck-boost converter can include three operation modes. For example, when input voltage Vin is much greater than output voltage Vo, the power stage circuit can operate in a buck mode. In this case, switch K4 can remain on, switch K3 can remain off, and switches K1 and K2 can alternately be turned on and off. When input voltage Vin is much less than output voltage Vo, the power stage circuit can operate in a boost mode. In this case, switch K1 can remain on, switch K2 can remain off, and switches K3 and K4 can alternately be turned on and off. When input voltage Vin is relatively close to output voltage Vo, the power stage circuit can operate in a buck-boost mode, and switches K1 through K4 can alternately be turned on and off.

However, in this approach, an over voltage condition or state of the output voltage that may be caused by a load change or transition may not be fully addressed. In one case, when the load changes from a relatively heavy load to a relatively light load, the output voltage can overshoot. For example, when the converter operates in a buck mode, switch K3 can remain off, switch K4 can remain on, and switches K1 and K2 can alternately be turned on and off. However, if the load changes from a heavy load to a light load, over voltage can occur, and switch K1 may be turned off and switch K2 may be turned on via a feedback control loop. In this case, energy on inductor L can be transmitted to the output terminal since an inductor current cannot change suddenly, and the over voltage condition may be worsened. In certain applications, factors such as hysteresis loop adjustment and logic delay may cause even heavier over voltage. Similar cases can also be found in boost and buck-boost modes of operation.

In one embodiment, an apparatus can include: (i) a buck-boost converter including a first switch coupled to an input terminal and an inductor, a second switch coupled to ground and a common node of the first switch and the inductor, a third switch coupled to ground and a common node of a fourth switch and the inductor, where the fourth switch is coupled to an output terminal of the buck-boost converter; (ii) an over voltage detection circuit configured to receive a voltage feedback signal indicative of an output voltage of the buck-boost converter, and an over voltage threshold signal, and to generate an over voltage signal; (iii) a first control circuit configured to generate a first PWM control signal according to an operation mode of the buck-boost converter; (iv) a first logic circuit configured to receive the first PWM control signal and the over voltage signal, and to control the first and second switches; (v) a second control circuit configured to generate a second PWM control signal according to the operation mode of the buck-boost converter; and (vi) a second logic circuit configured to receive the second PWM control signal and the over voltage signal, and to control the third and fourth switches.

Referring now to FIG. 2, shown is a schematic block diagram of an example over voltage protection control circuit of a four-switch buck-boost converter, in accordance with embodiments of the present invention. This particular example can include switches (e.g., transistors) K1, K2, K3, and K4, and also inductor L, as shown. The converter can also include over voltage detection circuit 201, control circuits 202 and 203, and driving circuits 208.

Over voltage detection circuit 201 can receive voltage feedback signal $V_{FB}$ (e.g., indicative of an output voltage of the converter) and over voltage threshold signal Vovp, and may generate over voltage signal OVP. For example, over voltage detection circuit 201 can include a voltage feedback circuit made of a voltage dividing resistor loop and a comparison circuit (e.g., a hysteresis comparator). Voltage feedback signal $V_{FB}$ may be generated by dividing the output voltage of the converter via the voltage dividing resistor loop. The hysteresis comparator may have a non-inverting input terminal for receiving voltage feedback signal $V_{FB}$, and an inverting input terminal for receiving over voltage threshold signal Vovp. For example, when voltage feedback signal $V_{FB}$ is greater than over voltage threshold signal Vovp, over voltage signal OVP may be activated.

Control circuit 202 can include PWM control circuit 206-1 and a first logic circuit. PWM control circuit 206-1 can generate PWM control signal PWM1 based on an operation mode of the converter. The first logic circuit can receive PWM control signal PWM1 and over voltage signal OVP, and may generate a first logic control signal to control switches K1 and K2 via driving circuit 208-1. Control circuit 203 can include PWM control circuit 206-2 and a second logic circuit. PWM control circuit 206-2 can generate PWM control signal PWM2 according to the operation mode of the converter. The second logic circuit can receive PWM control signal PWM2 and over voltage signal OVP, and may generate a second logic control signal to control switches K3 and K4 via driving circuit 208-2.

PWM control circuits 206 can be used to generate PWM control signals PWM1 and PWM2 according to the present operation mode of the converter. When an over voltage condition occurs, PWM control signal PWM1 may be used to control switches K1 and K2, and PWM control signal PWM2 may be used to control switches K3 and K4. These switches can be controlled such that the converter operates effectively in buck mode, boost mode, or buck-boost mode. In the buck mode of operation, switch K3 can remain off and switch K4 can remain on, and the turn on sequence can be: K1K4→K2K4→K1K4→K2K4. Thus in this case, switches K1 and K2 can alternately be turned on/off, while switch K4 remains on. In the boost mode of operation, switch K1 can remain on and switch K2 can remain off, and the turn on sequence can be: K1K3→K1K4→K1K3→K1K4. Thus in this case, switches K3 and K4 can alternately be turned on/off, while switch K1 remains on. In the buck-boost mode of operation, the turn on sequence can be: K1K3→K1K4→K2K4→K1K3→K1K4→K2K4.

For example, the first logic circuit can include inverter I1 and AND-gate I2, and over voltage signal OVP may be provided to a first input terminal of AND-gate I2 after being inverted by the inverter I1. A second input terminal of AND-gate I2 can receive PWM control signal PWM1, and an output terminal of AND-gate I2 can generate a first logic control signal. The second logic circuit can include OR-gate I3 with a first input terminal for receiving over voltage signal OVP, a second input terminal for receiving PWM control signal PWM2, and an output terminal for providing the second logic control signal. The first and second logic control signals can be used to control switches K1, K2, K3, and K4 via driving circuits 208 (e.g., 208-1 and 208-2). Driving circuit 208 can be any implemented using any suitable driving circuit, such as including buffers and additional logic circuitry.

When the load on the converter changes from a relatively heavy load to a relatively light load, or the load is disconnected from the converter, the output voltage can overshoot. When the over voltage detection circuit detects that the output voltage is in an over voltage condition, over voltage signal OVP can be activated (e.g., go high). The first logic circuit can receive an inverted version of over voltage signal OVP and PWM control signal PWM1 at AND-gate I2, and may generate a low level first logic control signal through the logical-AND operation. This control can result in turning on switch K2. In addition, the second logic circuit can receive over voltage signal OVP and PWM control signal PWM2, and can generate a high level second logic control signal through the logical-OR operation. This control can result in turning on switch K3 and turning off switch K4.

In this fashion, problems due to overshooting of the output voltage of a converter when the load is changing or transitioning can be substantially avoided. When an over voltage condition of the output voltage of the converter is detected, regardless of the circuit operation mode, the control circuit can control switches K1 and K4 to be off, and switches K2 and K3 to be on. In this way, energy on the inductor can be consumed via a loop formed of switch K2, inductor L, and switch K3, in order to prevent the output voltage from overshooting further or at all, so as to avoid damage to associated circuitry.

Figure 3A:
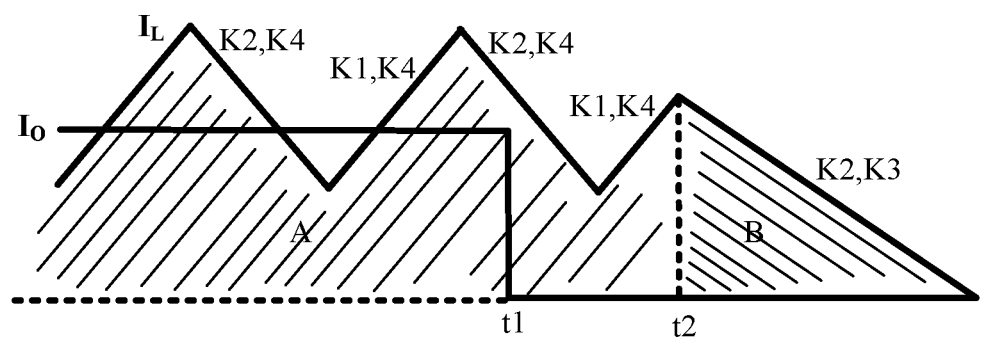
FIG. 3A is a waveform diagram of example operation during a first time period in a buck mode, in accordance with embodiments of the present invention.
Figure 3B:
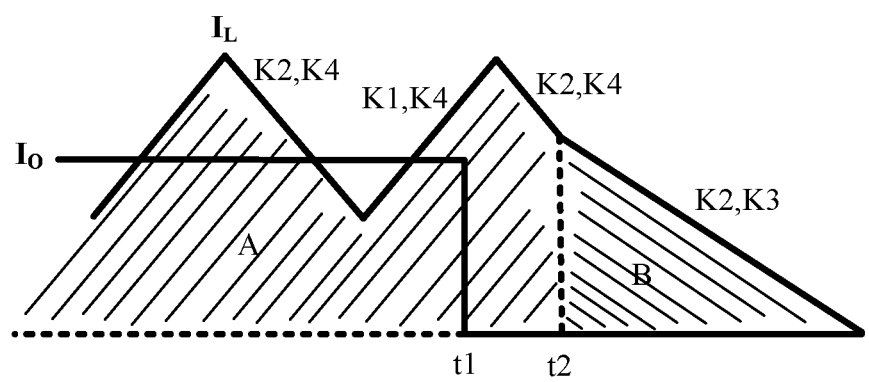
FIG. 3B is a waveform diagram of example operation during a second time period in a buck mode, in accordance with embodiments of the present invention.

Referring now to FIGS. 3A and 3B, shown are waveform diagrams of example operation in a buck mode, in accordance with embodiments of the present invention. When the circuit operates in a buck mode, energy may be transmitted to the output terminal continuously since switch K4 can remain on. In FIGS. 3A and 3B, shaded portion "A" may represent an energy transmission stage, and shaded portion "B" can represent an energy consuming stage. FIG. 3A shows a waveform diagram during a first time period in a buck operation mode. Here, the output voltage may be in an over voltage condition when switches K1 and K4 or on. For example, at time t1, the load may change from a heavy load to a light load, or the load may be disconnected from the converter. Output current $I_O$ can decrease rapidly, while inductor current $I_L$ may be still in a triangular wave form without a sudden change. Energy stored in inductor L can be provided to the output terminal. At time t2, when the voltage detection circuit detects that output voltage $V_O$ is in an over voltage condition, the circuit can turn off switch K1, turn on switch K2, turn on switch K3, and turn off switch K4. In this way, excess energy stored in inductor L can be consumed by a loop made up of switch K2, inductor L, and switch K3. Thus, energy transmitted from inductor L to the output terminal may be cut off in order to prevent output voltage $V_O$ from overshooting.

Similarly, as shown in FIG. 3B, during a second time period when the output voltage is in an over voltage condition and when switch K2 and switch K4 are on, at time t1, the load can change to a light load, or may be disconnected. In this case, output current $I_O$ can suddenly decrease, and inductor current $I_L$ may be still in a triangular wave form without sudden change until time t2. Over voltage detection circuit 201 can activate output voltage signal OVP, and the circuit can turn on switch K3, and turn off switch K4, such that the excess energy stored in inductor L can be consumed by a loop made up of switch K2, inductor L, and switch K3.

Figure 4A:
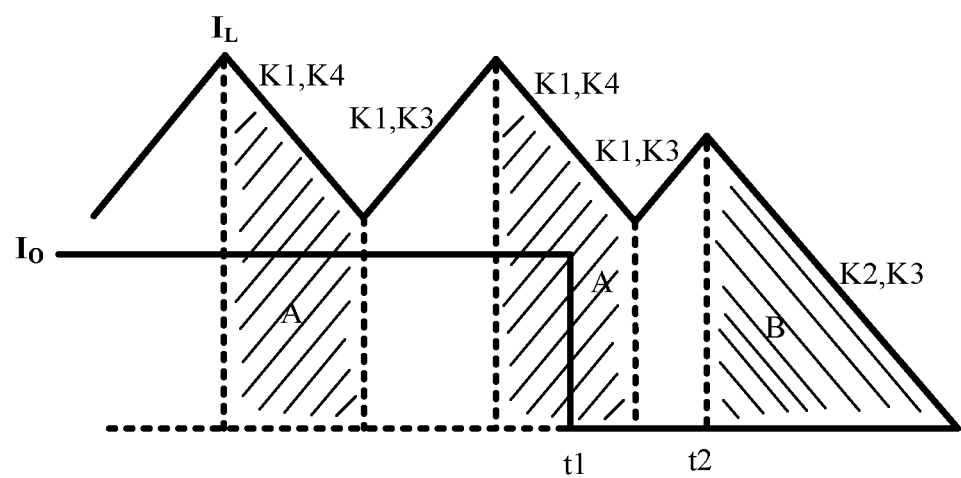
FIG. 4A is a waveform diagram of example operation during the first time period in a boost mode, in accordance with embodiments of the present invention.
Figure 4B:
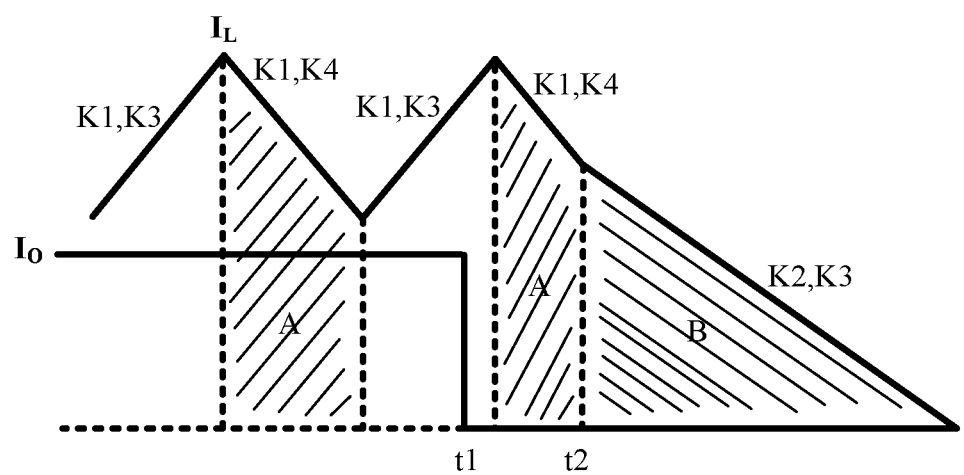
FIG. 4B is a waveform diagram of example operation during the second time period in a boost mode, in accordance with embodiments of the present invention.

Referring now to FIGS. 4A and 4B, shown are waveform diagrams of example operation in a boost mode, in accordance with embodiments of the present invention. When switch K4 is turned on, energy may be transmitted from the input terminal to the output terminal since switch K1 remains on. Shaded portion "A" in FIGS. 4A and 4B can represent an energy transmission stage, while shaded portion "B" can represent an energy consuming stage. FIG. 4A shows a waveform diagram during the first time period in a boost mode. Here, the output voltage may be in an over voltage condition when switch K1 and switch K3 are on. At time t1, the load on the converter can change from a relatively heavy load to a relatively light load, or the load may be disconnected from the converter. In this case, output current Io can suddenly decrease, while inductor current $I_L$ may be still in the form of a triangular wave without changing suddenly until time t2. Over voltage detection circuit 201 can activate output voltage signal OVP, and the circuit can turn off switch K1, and turn on switch K2. In this way, excess energy stored in inductor L can be consumed by a loop made up of switch K2, inductor L, and switch K3.

FIG. 4B shows a waveform diagram during the second time period in a boost mode. The output voltage may be in an over voltage condition when switches K1 and K4 are on. At time t1, the load can suddenly change from a heavy load to a light load, or the load can be disconnected. In this case, output current Io can decrease, while inductor current $I_L$ may remain in a triangular wave form without sudden change until time t2. Over voltage detection circuit 201 can activate output voltage signal OVP, and the circuit can turn off switch K1, turn on switch K2, turn off switch K4, and turn on switch K3. In this way, excess energy stored in inductor L can be consumed by a loop made up of switch K2, the inductor L, and switch K3.

Figure 5A:
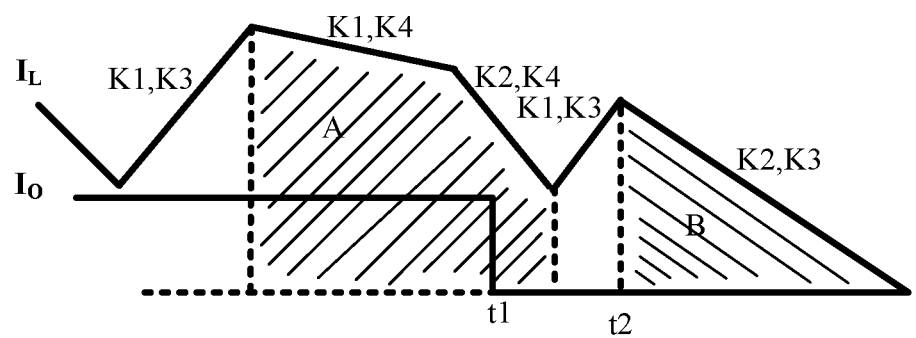
FIG. 5A is a waveform diagram of example operation during the first time period in a buck-boost mode, in accordance with embodiments of the present invention.
Figure 5B:
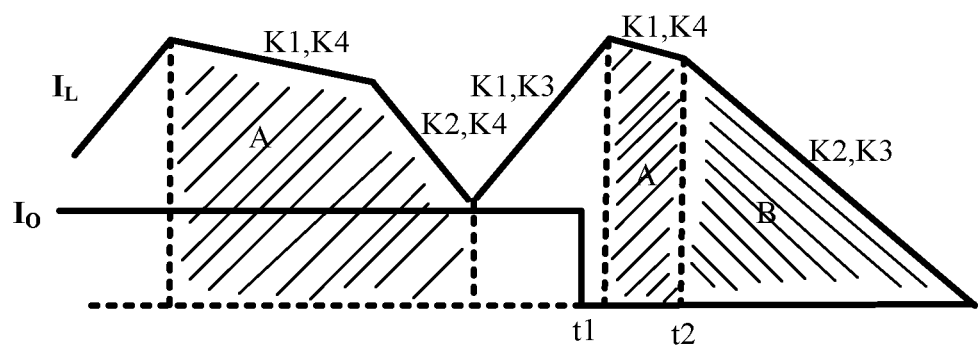
FIG. 5B is a waveform diagram of example operation during the second time period in a buck-boost mode, in accordance with embodiments of the present invention.
Figure 5C:
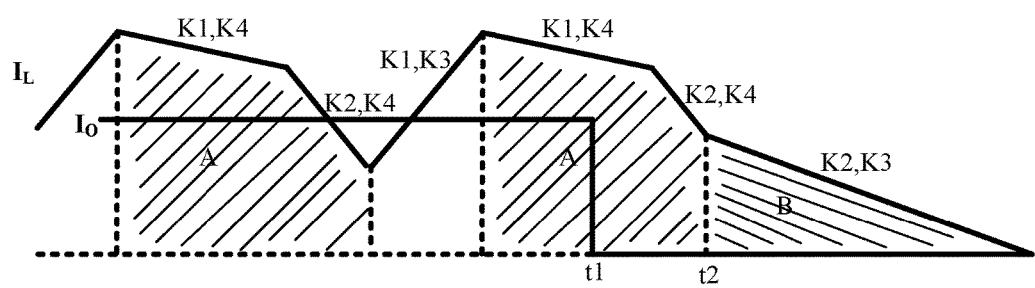
FIG. 5C is a waveform diagram of example operation during a third time period in a buck-boost mode, in accordance with embodiments of the present invention.

Referring now to FIGS. 5A, 5B, and 5C, shown are waveform diagrams of example operation in a buck-boost mode, in accordance with embodiments of the present invention. When switches K1 and K4 are on, energy can be transmitted from the input terminal to the output terminal of the converter. When switches K2 and K4 are on, energy stored in inductor L may be transmitted to the output terminal. Shaded portion "A" in FIGS. 5A, 5B, and 5C can represent an energy transmission stage, while shaded portion "B" can represent an energy consuming stage.

FIG. 5A shows a waveform diagram during the first time period in a buck-boost mode of operation. The output voltage may be in an over voltage condition when switches K1 and K3 are on. At time t1, the load can suddenly change to a light load, or the load may be disconnected from the converter. Output current $I_O$ can suddenly decrease, while inductor current $I_L$ can remain in a triangular wave form without sudden change until time t2. Over voltage detection circuit 201 can activate output voltage signal OVP, such that the control circuitry can turn off switch K1, and turn on switch K2. In this way, excess energy stored in inductor L can be consumed by the loop made up of switch K2, the inductor L, and switch K3.

FIG. 5B shows a waveform diagram during the second time period in a buck-boost mode of operation. The output voltage may be in an over voltage condition when switches K1 and K4 are on. At time t1, the load on the converter can suddenly change to a light load, or the load may be disconnected from the converter. In this case, output current Io can rapidly decrease, while inductor current $I_L$ retains a form of a triangular wave without changing suddenly until time t2. Over voltage detection circuit 201 can activate output voltage signal OVP, and control circuitry can turn off switch K1, turn on switch K2, turn off switch K4, and turn on switch K3. In this way, excess energy stored in inductor L can be consumed by the loop made up of switch K2, inductor L, and switch K3.

FIG. 5C shows a waveform diagram during the third time period in a buck-boost mode of operation. The output voltage may be in an over voltage condition when switches K2 and K4 are on. At time t1, the load on the converter can suddenly change from a heavy load to a light load, or the load may be disconnected from the converter. In this case, output current Io can rapidly decrease, while inductor current $I_L$ may remain in a triangular wave form without changing suddenly until time t2. Over voltage detection circuit 201 can activate output voltage signal OVP, and control circuitry can turn off switch K4, and turn on switch K3. In this way, excess energy stored in inductor L can be consumed by the loop made up of switch K2, inductor L, and switch K3.

In one embodiment, a method of over voltage protection control can include: (i) determining whether an output voltage of a buck-boost converter is in an over voltage condition, where the buck-boost converter includes a first switch coupled to an input terminal and an inductor, a second switch coupled to ground and a common node of the first switch and the inductor, a third switch coupled to ground and a common node of a fourth switch and the inductor, where the fourth switch is coupled to an output terminal of the buck-boost converter; and (ii) simultaneously controlling the first, second, third, and fourth switches in the buck-boost converter by turning on the second and third switches, and turning off the first and fourth switches, in response to the over voltage condition.

Figure 6:
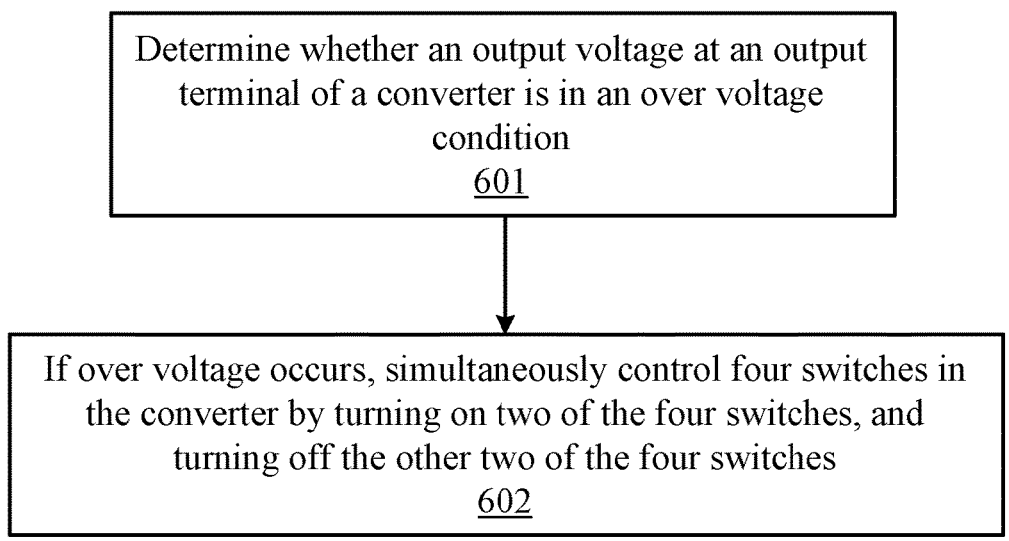
FIG. 6 is a flow diagram of an example method of over voltage protection control method of a four-switch buck-boost converter, in accordance with embodiments of the present invention.

Referring now to FIG. 6, shown is a flow diagram of an example method of over voltage protection control method of a four-switch buck-boost converter, in accordance with embodiments of the present invention. At S601, a determination can be made as to whether the output voltage at the output terminal of the converter is in an over voltage condition. For example, over voltage detection circuit 201 can activate over voltage signal OVP if the over voltage condition is detected. At S602, if over voltage occurs, four switches (e.g., K1, K2, K3, and K4) in the converter can be controlled (e.g., substantially simultaneously) in order to protect against the over voltage condition. For example, control circuitry can be employed in order to turn on switches K2 and K3, and to turn off switches K1 and K4, in order to cut off the flow of energy from the inductor to the output terminal, and to retain the energy in an internal loop.

In particular embodiments, over voltage protection control methods and circuits for a four-switch buck-boost converter can be used to detect whether the output voltage is in an over voltage condition, and to control accordingly control the four switches in response thereto. When the output voltage is in the over voltage condition, regardless of the operation mode of the converter, switches K1 and K4 can be turned off, and switches K2 and K3 can be turned on. In this way, energy transmitted from the input to the output terminal of the converter may be cut off, and energy stored in the inductor can be consumed through the loop made up of switch K2, inductor L, and switch K3. Accordingly, the output voltage can be substantially prevented from overshooting when the load suddenly changes from a heavy load to a light or non-connected load.

The above describes the over voltage protection control method and circuit for the four-switch buck-boost converter in accordance with preferred embodiments of the present invention in detail, what should be noted is, the control method of the present invention can also be applied in the cases that the four-switch Buck-Boost converter only operates in a Buck mode or boost mode or buck-boost mode, the turning on order under buck-boost mode is not limited to the order described in above embodiment, other turning on order can also be employed. Also, people skilled in the art may infer that other technologies, structures, circuit layouts or components can all be used in embodiments of the present invention.

The embodiments were chosen and described in order to best explain the principles of the invention and its practical applications, to thereby enable others skilled in the art to best utilize the invention and various embodiments with modifications as are suited to the particular use contemplated. It is intended that the scope of the invention be defined by the claims appended hereto and their equivalents.

What is claimed is:

1. A controlling method for over voltage protection control, the method comprising:
    a) determining whether an output voltage of a buck-boost converter is in an over voltage condition, wherein said buck-boost converter comprises a first switch coupled to an input terminal and an inductor, a second switch coupled to ground and a common node of said first switch and said inductor, a third switch coupled to ground and a common node of a fourth switch and said inductor, wherein said fourth switch is coupled to an output terminal of said buck-boost converter; and
    b) turning on said second and third switches, and turning off said first and fourth switches, in direct response to said over voltage condition.

2. The method of claim 1, wherein when said converter operates in a buck mode, the method further comprises:
    a) during a first time period when said first and fourth switches are on, and said output voltage is in said over voltage condition, turning off said first and fourth switches, and turning on said second and third switches; and
    b) during a second time period when said second and fourth switches are on, and said output voltage is in said over voltage condition, turning on said third switch, and turning off said fourth switch.

3. The method of claim 1, wherein when said buck-boost converter operates in a boost mode, the method further comprises:
    a) during a first time period when said first and third switches are on, and said output voltage is in said over voltage condition, turning off said first switch, and turning on said second switch; and
    b) during a second time period when said first and fourth switches are on, and said output voltage is in said over voltage condition, turning off said first and fourth switches, turning on said second and third switches.

4. The method of claim 1, wherein when said buck-boost converter operates in a buck-boost mode, the method further comprises:
    a) during a first time period when said first and third switches are on, and said output voltage is in said over voltage condition, turning off said first switch, and turning on said second switch;
    b) during a second time period when said first and fourth switches are on, and said output voltage is in said over voltage condition, turning off said first and fourth switches, and turning on said second and third switches; and
    c) during a third time period when said second and fourth switches are on, and said output voltage is in said over voltage condition, turning on said third switch, and turning off said fourth switch.

5. An apparatus, comprising:
a) a buck-boost converter comprising a first switch coupled to an input terminal and an inductor, a second switch coupled to ground and a common node of said first switch and said inductor, a third switch coupled to ground and a common node of a fourth switch and said inductor, wherein said fourth switch is coupled to an output terminal of said buck-boost converter;
b) an over voltage detection circuit configured to receive a voltage feedback signal indicative of an output voltage of said buck-boost converter, and an over voltage threshold signal, and to generate an over voltage signal;
c) a first control circuit configured to generate a first PWM control signal according to an operation mode of said buck-boost converter;
d) a first logic circuit configured to receive said first PWM control signal and said over voltage signal, and to directly control said first and second switches when said over voltage signal is activated;
e) a second control circuit configured to generate a second PWM control signal according to said operation mode of said buck-boost converter; and
f) a second logic circuit configured to receive said second PWM control signal and said over voltage signal, and to directly control said third and fourth switches when said over voltage signal is activated.

6. The apparatus of claim 5, wherein said over voltage detection circuit comprises:
a) a voltage feedback circuit configured to receive said output voltage of said buck-boost converter, and to generate said voltage feedback signal; and
b) a comparator configured to compare said voltage feedback signal against said over voltage threshold signal, and to activate said over voltage signal when said voltage feedback signal is greater than said over voltage threshold signal.

7. The apparatus of claim 5, wherein said first logic circuit comprises:
a) an inverter configured to receive said over voltage signal; and
b) an AND-gate configured to receive an output of said inverter and said first PWM control signal, and to provide a first logic control signal to a first driving circuit for controlling said first and second switches.

8. The apparatus of claim 5, wherein said second logic circuit comprises an OR-gate configured to receive said over voltage signal and said second PWM control signal, and to provide a second logic control signal to a second driving circuit for controlling said third and fourth switches.

9. The apparatus of claim 5, wherein said over voltage detection circuit comprises a comparator.

10. The apparatus of claim 9, wherein said comparator is configured as a hysteresis comparator.

11. The apparatus of claim 5, wherein said second and third switches are controlled to be on, and said first and fourth switches are controlled to be off, when said voltage feedback signal is greater than said over voltage threshold signal.

12. The method of claim 1, wherein said determining whether said output voltage of said buck-boost converter is in said over voltage condition comprises using a comparator.

13. The method of claim 12, wherein said comparator is configured as a hysteresis comparator.

14. The method of claim 1, wherein said determining whether said output voltage of said buck-boost converter is in said over voltage condition comprises determining if a voltage feedback signal indicative of said output voltage is greater than an over voltage threshold signal.

15. The method of claim 14, wherein said second and third switches are controlled to be on, and said first and fourth switches are controlled to be off, when said voltage feedback signal is greater than said over voltage threshold signal.

16. The method of claim 1, wherein said turning on said second and third switches, and turning off said first and fourth switches, in direct response to said over voltage condition, is independent of a previous state of said first, second, third, and fourth switches.

* * * * *